United States Patent
McLaren et al.

(10) Patent No.: US 11,336,592 B2
(45) Date of Patent: May 17, 2022

(54) FLEXIBLE LINK LEVEL RETRY FOR SHARED MEMORY SWITCHES

(71) Applicant: Google LLC, Mountain View, CA (US)

(72) Inventors: Moray McLaren, Mountain View, CA (US); Alan Kulawik, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/993,925

(22) Filed: Aug. 14, 2020

(65) Prior Publication Data

US 2022/0052969 A1 Feb. 17, 2022

(51) Int. Cl.
*H04L 49/9005* (2022.01)
*H04L 47/34* (2022.01)
*H04L 49/00* (2022.01)
*H04L 49/90* (2022.01)

(52) U.S. Cl.
CPC .......... *H04L 49/9005* (2013.01); *H04L 47/34* (2013.01); *H04L 49/3027* (2013.01); *H04L 49/9021* (2013.01)

(58) Field of Classification Search
CPC ............. H04L 49/9005; H04L 49/9021; H04L 49/3027; H04L 47/34
See application file for complete search history.

(56) References Cited

U.S. PATENT DOCUMENTS

| | | | |
|---|---|---|---|
| 6,211,695 B1 * | 4/2001 | Agrawal .......... | H03K 19/17728 326/38 |
| 6,625,159 B1 * | 9/2003 | Singh .................... | H04L 49/103 370/235 |
| 7,606,253 B2 | 10/2009 | Lesartre et al. | |
| 7,991,875 B2 | 8/2011 | Chou et al. | |
| 8,671,220 B1 * | 3/2014 | Garg ..................... | H04L 49/103 709/244 |
| 9,306,769 B2 | 4/2016 | Bloch et al. | |
| 2003/0026267 A1 * | 2/2003 | Oberman ................ | H04L 47/10 370/397 |
| 2007/0147437 A1 * | 6/2007 | Yasui .................... | H04L 1/1854 370/519 |

(Continued)

FOREIGN PATENT DOCUMENTS

WO 2016183155 A1 11/2016

OTHER PUBLICATIONS

Extended European Serch Report for European Patent Application No. 21156300.2 dated Jul. 2, 2021. 7 pages.

*Primary Examiner* — Christine Ng
(74) *Attorney, Agent, or Firm* — Lerner, David, Littenberg, Krumholz & Mentlik, LLP (57) ABSTRACT

Disclosure is made of a shared memory switch and methods and system for controlling such. The shared memory switch may allocate cells in a storage array to respective use cases, the use cases including input buffering, output queuing, free cell allocation, and retry buffering. A set of data packets may be stored in the cells allocated to output queuing, wherein each cell allocated to output queuing stores a respective data packet of the set of data packets. A subset of the set of data packets may be transmitted to a destination external to the shared memory switch. The cells storing the subset of data packets may be reallocated to the retry buffering use case, wherein cells allocated to retry buffering use case are a retry buffer.

17 Claims, 6 Drawing Sheets

(56) References Cited

U.S. PATENT DOCUMENTS

2008/0239358 A1\* 10/2008 Uno ..................... G06F 13/387
  358/1.13
2018/0014591 A1   1/2018 Groff \* cited by examiner

| | t0 | t1 | t2 | t3 | t4 | t5 | t6 | t7 | t8 | t9 | t10 | t11 | t12 | t13 | t14 | t15 |
|---|---|---|---|---|---|---|---|---|---|---|---|---|---|---|---|---|
| Time | | | | | | | | | | | | | | | | |
| RX Expected | 0 | 0 | 0 | 1 | 2 | 3 | 4 | 4 | 4 | 4 | 4 | 4 | 5 | 6 | 7 | 8 |
| TX Send | 0 | 1 | 2 | 3 | 4 | 5 | 6 | 7 | 8 | 4 | 5 | 6 | 7 | 8 | 9 | 10 |
| RX Input | n/a | n/a | 0 | 1 | 2 | 3 | x | 5 | 6 | 7 | 8 | 4 | 5 | 6 | 7 | 8 |
| TX Ack | 0 | 0 | 0 | 0 | 1 | 2 | 3 | 4 | 4 | 4 | 4 | 4 | 4 | 5 | 6 | 7 |
| Retry Req | | | | | | | | | Y | Y | Y | Y | | | | |
| Retrying | | | | | | | | | | Y | Y | Y | Y | Y | | |
| Retry Buff Tail | 0 | 1 | 2 | 3 | 4 | 5 | 6 | 7 | 8 | 8 | 8 | 8 | 8 | 8 | 9 | 10 |
| Retry Buff Head | 0 | 0 | 0 | 0 | 0 | 1 | 2 | 3 | 4 | 4 | 4 | 4 | 4 | 4 | 5 | 6 |
| Buffer Occupancy | 0 | 1 | 2 | 3 | 4 | 4 | 4 | 4 | 4 | 4 | 4 | 4 | 4 | 4 | 4 | 4 |

FLEXIBLE LINK LEVEL RETRY FOR SHARED MEMORY SWITCHES

BACKGROUND

Data is typically split into smaller data units, referred to as packets, before being transmitted across a network. A source may transmit each data packet to a destination. The data may be reconstructed from the packets, once the destination receives all of the packets. During transmission, each packet may traverse many different nodes with each node directing the packet to its next location until the packet reaches its intended destination. Each time a packet traverses a node may be considered a hop.

During the transmission of packets, issues such as congestion, network disconnects, malfunctioning nodes, etc., may result in packets being dropped and not received by the destination. Data packet losses may be remedied by the retransmission of the lost packets by the source. Such retransmission may include an end-to-end retry protocol, such as in TCP/IP, where the retransmission is performed by the source at the request of the destination. End-to-end retry is generally slow and inefficient as the request for the retransmission of packets from the destination to the source and the resending of the packets from the source to the destination each typically requires many hops, as the requests and packets may traverse hundreds or thousands of nodes, and in some instances, even more nodes. In some cases, the source may automatically retransmit packets a destination does not acknowledge receipt of the packets, but the retransmitted packets still must traverse every hop from the source to the destination.

Another retransmission protocol is link level retry. Link level retry ensures that for every hop by a packet, the packet is received by the destination. In this regard, an acknowledgment for a received packet or packets may be transmitted from the receiving node to the sending node to confirm that a packet has been successfully received at every hop. In instances where acknowledgment is not received, or the receiving node indicates that it did not receive the expected packet or packets, the sending node may resend the packet or packets. Link level retry requires the provisioning of retransmission buffers at link outputs to store the packets that were transmitted until a receiving node provides confirmation that the packets have been received. Depending on the bandwidth delay of the link between the sending and receiving nodes, the buffers can be large, such as around 8 Megabytes or more. This may result in significant overhead if link level retry is only used in certain applications, and not required for all data transmissions.

BRIEF SUMMARY

Aspects of this disclosure provide link level retry buffering within a dynamically resizable retry buffer of a shared memory switch. One aspect of the disclosure is directed to a shared memory switch comprising one or more input ports; one or more output ports; a memory controller; and a shared buffer including a storage array comprising an array of cells configured to hold packets of data received from one or more sources through the one or more input ports and to be transmitted onto one or more destinations through the one or more output ports, said array of cells configured to store a dynamically resizable retry buffer.

In some instances the memory controller is configured to allocate each cell in the storage array to a respective use case, the use cases including input buffering, output queuing, free cell allocation, and retry buffering. In some examples, each cell of the storage array allocated to input buffering is configured to receive an incoming packet received from the one or more sources through the one or more input puts. In some examples, each cell of the storage array allocated to the free cell allocation is capable of being reallocated to the input buffering use case or output queuing use case by the memory controller.

In some examples each cell of the storage array allocated to the output queue is configured to store a packet of data received from the one or more sources in a queue to be transmitted to the one or more destinations. The memory controller may be further configured to reallocate a first cell of the storage array allocated to the output queue to a retry buffer allocation after the shared memory switch transmits a packet of data from the first cell to one of the one or more destinations. In some examples, the memory controller is further configured to reallocate the first cell from the retry buffer allocation to a free cell allocation upon receiving acknowledgment that the one of the one or more destinations received the packet of data. In some instances, the packet of data is transmitted to the one of the one or more destination using link level retry protocols.

In some instances, the cells having a retry buffer allocation are the dynamically resizable retry buffer.

In some instances, the shared buffer is dynamic random-access memory (DRAM) modules or static random-access memory (SRAM).

In some instances, the memory controller includes memory and one or more processors.

Another aspect of the disclosure is directed to a method for controlling a shared memory switch. The method comprises allocating, by one or more processors, cells in a storage array to respective use cases, the use cases including input buffering, output queuing, free cell allocation, and retry buffering; storing, by the one or more processors, a set of data packets in the cells allocated to output queuing, wherein each cell allocated to output queuing stores a respective data packet of the set of data packets; transmitting, by the one or more processors, a subset of the set of data packets to a destination external to the shared memory switch; and reallocating, by the one or more processors, the cells storing the subset of data packets to the retry buffering use case, wherein cells allocated to retry buffering use case form a retry buffer.

In some examples each data packet in the subset of data packets includes a sequence number, and the subset of data packets are transmitted in an order based on their respective sequence numbers. In some examples, the method further comprises receiving, from the destination, a request for retry of a transmission of one of the data packets in the subset of data packets, the request for retry including an identifier corresponding to a sequence number of one of the data packets in the subset of data packets. In some examples, the method further comprises retransmitting the data packet having the sequence number corresponding to the identifier. In some examples, the method further comprises retransmitting all other packets in the subset of data packets that were transmitted after the data packet having the sequence number corresponding to the identifier.

In some instances, the method further comprises receiving, from the destination, an acknowledgment of receipt of the subset of data packets; and reallocating, in response to receiving the acknowledgment of receipt, the cells storing the subset of data packets to a free cell allocation.

Another aspect of the disclosure is directed to a non-transitory computer readable medium containing program instructions. The instructions when executed by one or more computing devices, cause the one or more computing devices to perform the steps of: allocating cells in a storage array with a shared memory switch to respective use cases, the use cases including input buffering, output queuing, free cell allocation, and retry buffering; storing a set of data packets in the cells allocated to output queuing, wherein each cell allocated to output queuing stores a respective data packet of the set of data packets; transmitting a subset of the set of data packets to a destination external to the shared memory switch; and reallocating the cells storing the subset of data packets to the retry buffering use case, wherein cells allocated to retry buffering use case form a retry buffer. In some examples, each data packet in the subset of data packets includes a sequence number, and the subset of data packets are transmitted in an order based on their respective sequence numbers. In some instances, the instructions further cause the one or more computing devices to receive, from the destination, a request for retry of a transmission of one of the data packets in the subset of data packets, the request for retry including an identifier corresponding to a sequence number of one of the data packets in the subset of data packets.

DETAILED DESCRIPTION

The technology relates to a shared memory switch having a dynamically resizable retry buffer within a storage array. The storage array may include an array of cells with each cell having allocation for a distinct use case. The use cases may include output queuing, input buffering, free cell allocation, and retry buffer. Each cell may be reallocated from one use case to another use case. For example, when the switch sends a packet using link level protocol from a cell allocated for output queueing, the cell may not be immediately returned to a free cell allocation as typically occurs; rather the allocation of the cell may be changed from output queuing to a retry buffer allocation.

Upon receiving an acknowledgment, or other such confirmation that the sent packet was received at the intended destination, the cell may be reallocated from the retry buffer allocation to a free cell allocation. When acknowledgment that the sent packet is not received from the intended destination, the switch may resend the packet as a retransmit from the cell now having a retry buffer allocation. The allocation of the cell may remain a retry buffer until the switch receives acknowledgment that the retransmitted packet was successfully received by the destination, at which time the cell may be reallocated to a free cell allocation.

By incorporating the retry buffer into the storage array and selectively enabling the allocation of cells into and out of the retry buffer, the retry buffer may dynamically grow and shrink. In this regard, as packets are transmitted using link level retry protocol the number of cells allocated to the retry buffer may increase. The number of cells allocated to the retry buffer may shrink in response to acknowledgments from the intended destinations that the packets were received, thereby causing the cells to be reallocated from the retry buffer to a free cell allocation. In some instances, the retry buffer allocation may be capped, so that if a destination stops responding with acknowledgments of received packets the allocation of cells to the retry buffer by the switch may be limited so not to consume the entirety of the storage array within the switch.

Additionally, by not statically defining the size of the retry buffer, more space may be made available for input or output buffering by the switch when sending and receiving data that does not use the link level retry protocol. In this regard, the switch may only allocate cells to the retry buffer when the packets associated with the cells are transmitted using the link level retry protocol. When packets are transmitted without the use of the link level retry protocol, the cells may be immediately reallocated to a free cell allocation, thereby not requiring the use of the retry buffer. As the amount of memory available in a switch may be limited by cost and space, being able to dynamically adjust the size of the retry buffer reduces the need to add additional memory to the switch to account for retry buffering.

Figure 1:
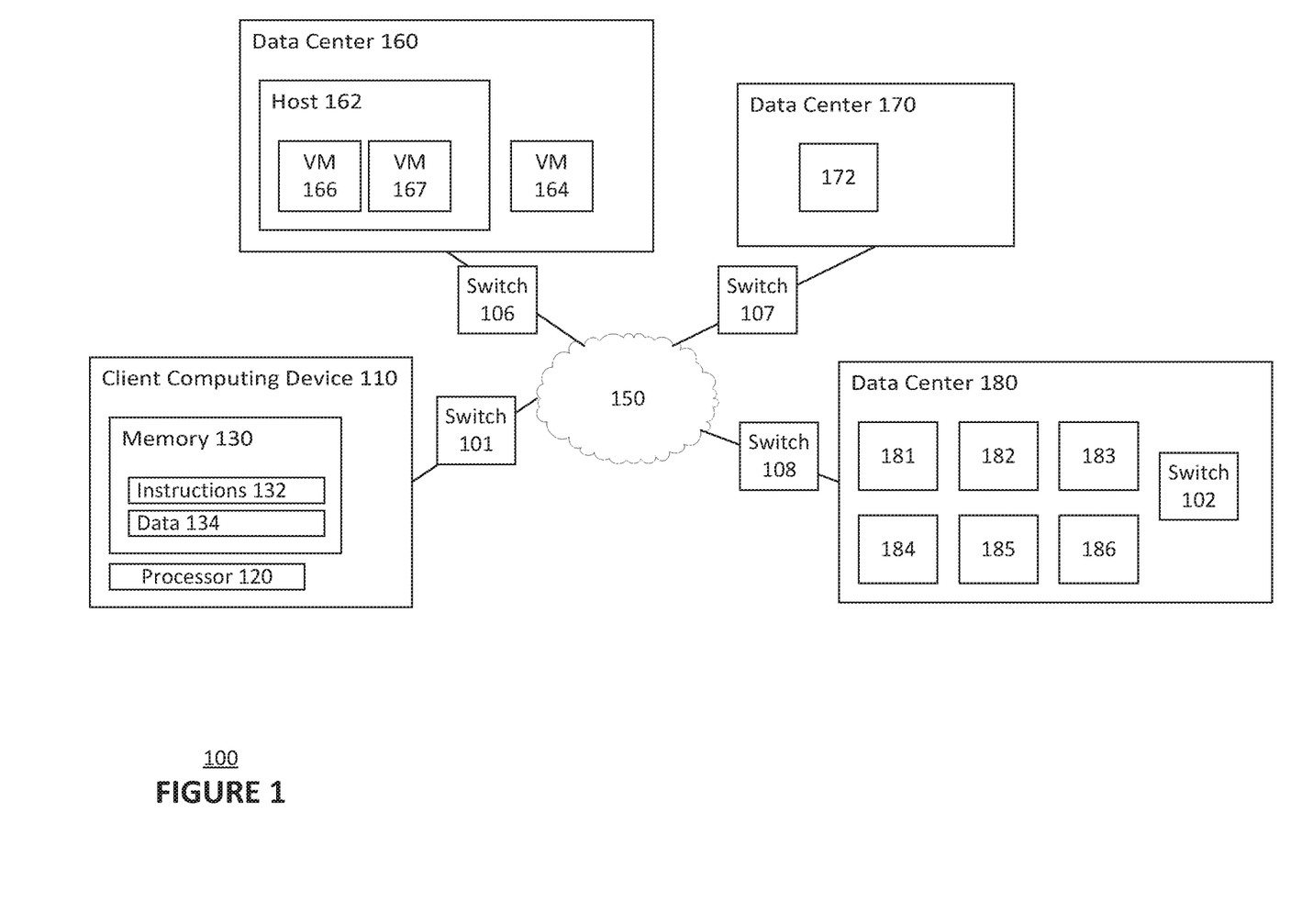
FIG. 1 is a functional diagram of an example system in accordance with aspects of the disclosure.

FIG. 1 illustrates an example system 100 including a distributed computing system. A plurality of data centers 160, 170, 180 may be communicatively coupled, for example, over a network 150 via switches 106, 107, and 108, respectively. The data centers 160, 170, 180 may further communicate with one or more client devices, such as client computing device 110 which is connected to the network 150 via switch 101. Thus, for example, the client computing device 110 may execute operations in "the cloud."

Each client computing device 110 may be a personal computer, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 120, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client computing device 110 may contain a processor 120, memory 130, and other components typically present in general purpose computers. The memory 130 can store information accessible by the processor 120, including instructions 132 that can be executed by the processor 120. Memory 130 can also include data 134 that can be retrieved, manipulated or stored by the processor 120. The memory 130 may be a type of non-transitory computer readable medium capable of storing information accessible by the processor 120, such as a hard-drive, solid state drive, flash drive, tape drive, optical storage, memory card, ROM, RAM, DVD, CD-ROM, write-capable, and read-only memories. The processor 120 can be a well-known processor or other lesser-known types of processors. Alternatively, the processor 120 can be a dedicated controller such as an application specific integrated circuit (ASIC), field programmable gate array (FPGA), etc. Additionally, the processor 120 may include multiple processors, multi-core processors, or a combination thereof.

The instructions 132 can be a set of instructions executed directly, such as machine code, or indirectly, such as scripts, by the processor 120. In this regard, the terms "instructions," "steps" and "programs" can be used interchangeably herein. The instructions 132 can be stored in object code format for direct processing by the processor 120, or other types of computer language including scripts or collections of independent source code modules that are interpreted on demand or compiled in advance.

The data 134 can be retrieved, stored or modified by the processor 120 in accordance with the instructions 132. For instance, although the system and method is not limited by a particular data structure, the data 134 can be stored in computer registers, in a distributed storage system as a structure having a plurality of different fields and records, or documents, or buffers. The data 134 can also be formatted in a computer-readable format such as, but not limited to, binary values, ASCII or Unicode. Moreover, the data 134 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 120 and memory 130 as being within the same block, the processor 120 and memory 130 may actually include multiple processors and memories that may or may not be stored within the same physical housing. For example, some of the instructions 132 and data 134 can be stored on a removable CD-ROM and others within a read-only computer chip. Some or all of the instructions and data can be stored in a location physically remote from, yet still accessible by, the processor 120. Similarly, the processor 120 can actually include a collection of processors, which may or may not operate in parallel.

The data centers 160, 170, 180 may be positioned a considerable distance from one another. For example, the data centers may be positioned in various countries around the world. Each data center 160, 170, 180 may include one or more computing devices, such as processors, servers, shards, or the like. For example, as shown in FIG. 1, data center 160 includes computing devices 162, 164, data center 170 includes computing device 172, and data center 180 includes computing devices 181-186. According to some examples, the computing devices may include one or more virtual machines running on a host machine. For example, computing device 162 may be a host machine, supporting a plurality of virtual machines 166, 167 running an operating system and applications. While only a few virtual machines 166, 167 are illustrated in FIG. 1, it should be understood that any number of virtual machines may be supported by any number of host computing devices. Moreover, it should be understood that the configuration illustrated in FIG. 1 is merely an example, and that the computing devices in each of the example data centers 160, 170, 180 may have various structures and components that may be the same or different from one another.

Programs may be executed across these computing devices, for example, such that some operations are executed by one or more computing devices of a first data center while other operations are performed by one or more computing devices of a second data center. In some examples, the computing devices in the various data centers may have different capacities. For example, the different computing devices may have different processing speeds, workloads, etc. While only a few of these computing devices are shown, it should be understood that each data center 160, 170, 180 may include any number of computing devices, and that the number of computing devices in a first data center may differ from a number of computing devices in a second data center. Moreover, it should be understood that the number of computing devices in each data center 160, 170, 180 may vary over time, for example, as hardware is removed, replaced, upgraded, or expanded. Additionally, although FIG. 1 illustrates only a single client computing device 110 and three data centers 160, the system 100 may include any number of computing devices and/or data centers.

Moreover, various backend systems may be built upon the distributed storage system. For example, identity management systems, domain name server (DNS) setting management systems, etc. Such backend systems may to some extent be interrelated. For example, a user of the DNS setting management system may log in using an identification managed by the identity management system.

In some examples, each data center 160, 170, 180 may also include a number of storage devices (not shown), such as hard drives, flash drives, flash memory, random access memory, disks, disk arrays, tape drives, or any other types of storage devices. The data centers 160, 170, 180 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The data centers may include a number of other devices in addition to the storage devices, such as cabling, routers, etc. Further, in some examples the data centers 160, 170, 180 may be virtualized environments. Further, while only a few data centers 160, 170, 180 are shown, numerous data centers may be coupled over the network 150 and/or additional networks.

Client computing device 110 and data centers 160, 170, 180 may be capable of direct and indirect communication such as over network 150 via one or more switches. For example, using an Internet socket, a client computing device 110 can connect to a service operating on remote servers through an Internet protocol suite. Servers can set up listening sockets that may accept an initiating connection for sending and receiving information. The network 150, and intervening nodes, including switches 101, 106, 107, and/or 108, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

As illustrated in FIG. 1, each computing device and/or data center may be connected to the network 150 by a switch. Although FIG. 1 illustrates a single switch connecting each of client computing device 110 and data centers 160, 170, 180 to the network 150, any number of switches may connect the computing devices and data centers to the network. Moreover, switches may be included within each data center for connecting computing devices, including processors, servers, shards, etc., together. For instance, computing devices 181-186 in data center 180 may be connected together and/or to the network 150 via switch 102. Moreover, the network 150 may itself include any number of switches. The switches may be shared memory switches capable of handling various retransmission protocols, such as link level retry.

Figure 2:
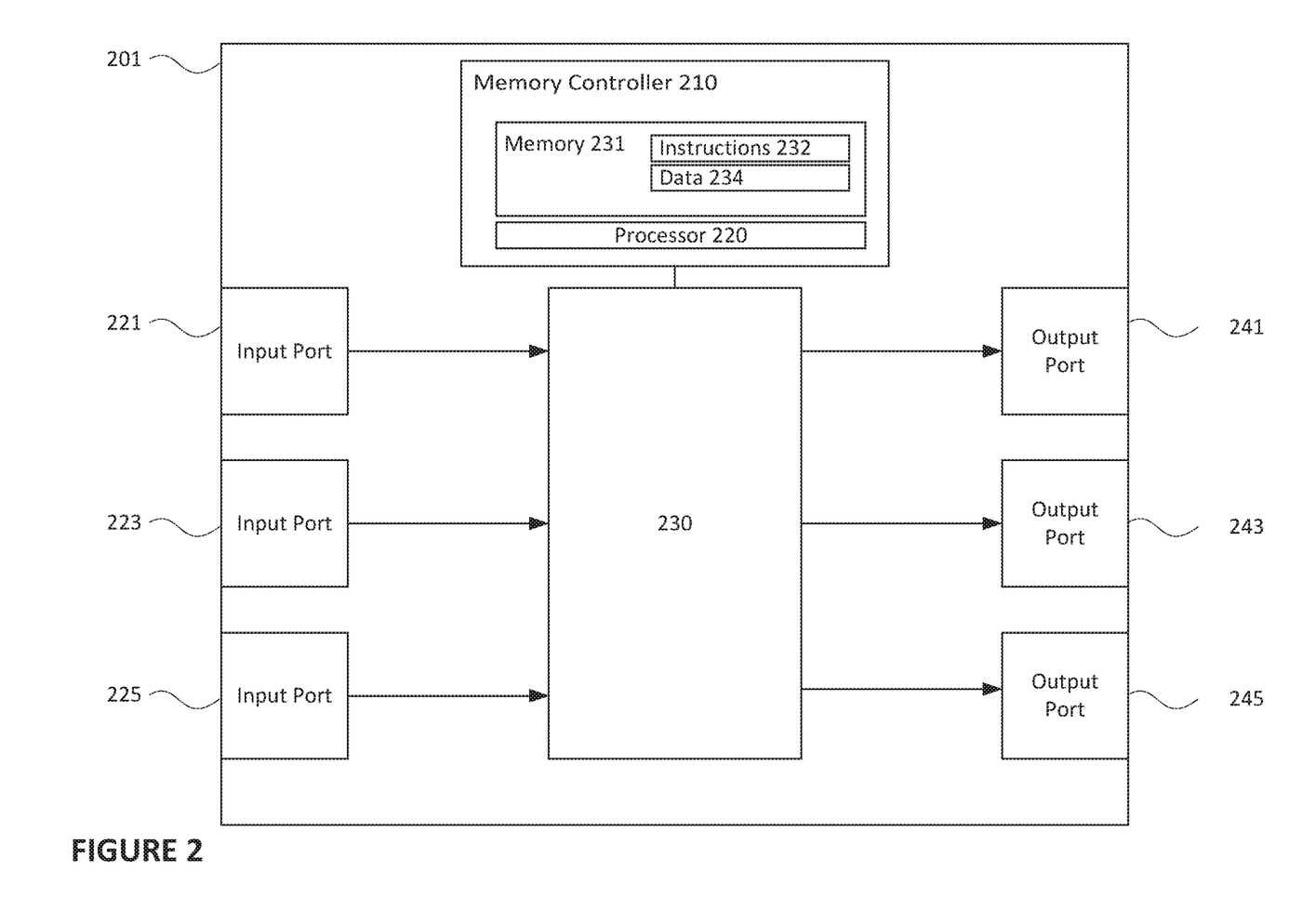
FIG. 2 illustrates an example network switch in accordance with aspects of the disclosure.

FIG. 2 illustrates an example shared memory switch 201. The shared memory switch 201 includes input ports 221-225, output ports 241-245, a shared buffer 230, and a memory controller 210. Although the shared buffer 230 and the memory controller 210 are shown as being separate components, the shared buffer and memory controller may be implemented on the same die or a separate dies. The input ports 221-225 may receive packets of data from one or more sources, such as a computing device, another switch, a router, or other such network device capable of transmitting packets. The output ports 241-245 may transmit packets of data to one or more destinations, which may include computing devices or other network devices capable of receiving packets. Although not shown, the input and output ports may include logic for receiving and sending packets in accordance with instructions received from the memory controller 210.

The shared buffer 230 may be generally structured as an array of cells configured to hold packets of data received from sources and to be forwarded onto destinations. In this regard, the cells operate as packet buffers and the traversal of the packets into and out of the switch results in a hop. As described further herein, each cell in the shared buffer 230 can be flexibly allocated between use cases including output queuing, input buffering, free cell allocation, and retry buffering. The shared buffer 230 may be constructed from integrated memory within the switch 201 including any of DRAM, SRAM, etc., stacked memory including memory on one or more separate dies which are stacked onto the memory controller, co-packaged memory including one or more separate dies connected to the memory controller 210 through an interposer or substrate, known as high-bandwidth memory, and/or off-chip memory—such as a DRAM module. Although the examples herein describe each cell as handling a single packet, each cell may handle multiple packets and/or portions of packets.

The memory controller 210 may include a processor 220 and memory 231 storing instructions 232 and data 234. The processor may be similar to processor 120 and memory 231 may be similar to memory 130. The instructions 232 may be implemented by the memory controller 210 to control the routing of packets in and out of the switch 201, as well as the allocation of cells within the shared buffer between use cases including output queuing, input buffering, free cell allocation, and retry buffering, as described further herein. Cells allocated for input buffering or having free cell allocations do not contain data or may contain data that may be overwritten, while cells allocated for output queuing and retry buffering contain packets.

Figure 3:
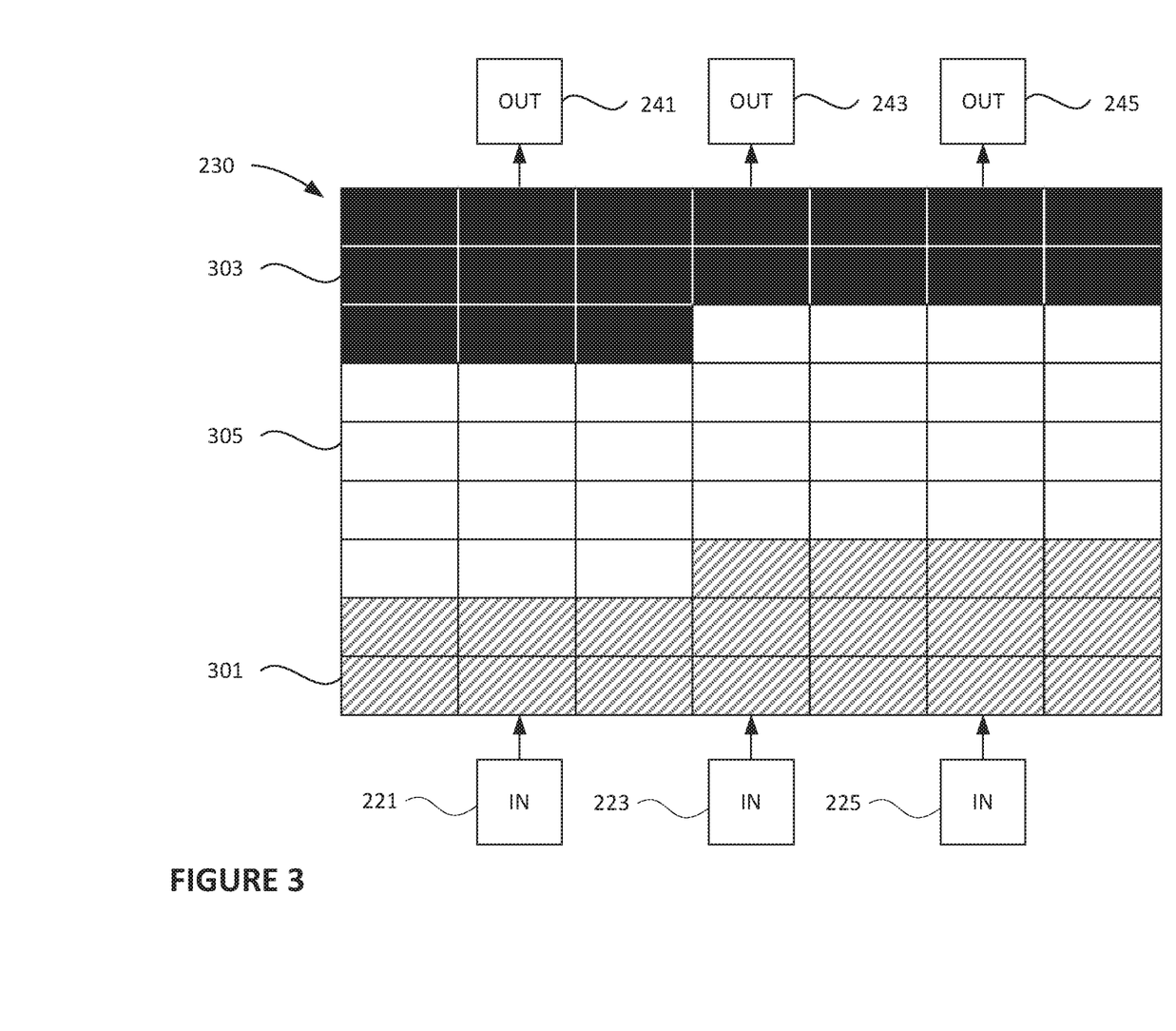
FIG. 3 illustrates an example allocation of cells within a shared buffer without any retry buffering cell allocations in accordance with aspects of the disclosure.

FIG. 3 illustrates an example allocation of cells within shared buffer 230 without any retry buffering cell allocations. A first set of cells 301 is allocated to the use case of input buffering. In this regard, these cells are set to receive data packets being received by one or more of the input ports 221-225 of switch 201 from one or more sources. Upon storing a data packet, a cell allocated for input buffering may be reallocated to output queuing. For example, cells 303 in FIG. 3 are allocated to a use case of output queuing. The memory controller 210 may control a queue comprising the cells allocated for output queueing 303. The queue may define the order which the cells 303 should transmit their respective packets and through which output ports 241-245 the packets should be transmitted. Upon transmitting their respective packets, cells 303 may be reallocated by the memory controller 210 to a free cell allocation 305. From the free cell allocation 305, the memory controller 210 may allocate the cells to input buffering or output queuing allocations. In some instances, such as when the switch 201 is used to direct network traffic without any link level retry communications, all of the cells in the shared buffer 230 may be allocated to output queuing to allow the switch 201 to output the packets as soon as the packet arrives.

Once data, such as a packet, is in a cell in the cell array, it may stay in the same cell for the entirety of its duration in the switch 201. Moreover, although the examples illustrated herein show cells being allocated to use cases in a contiguous manner in the shared buffer 230, any cell can be allocated to any use case. In other words, the cells may not be allocated to use cases in a contiguous manner, but use cases may be distributed throughout the cell array of the shared buffer 230.

Figure 4:
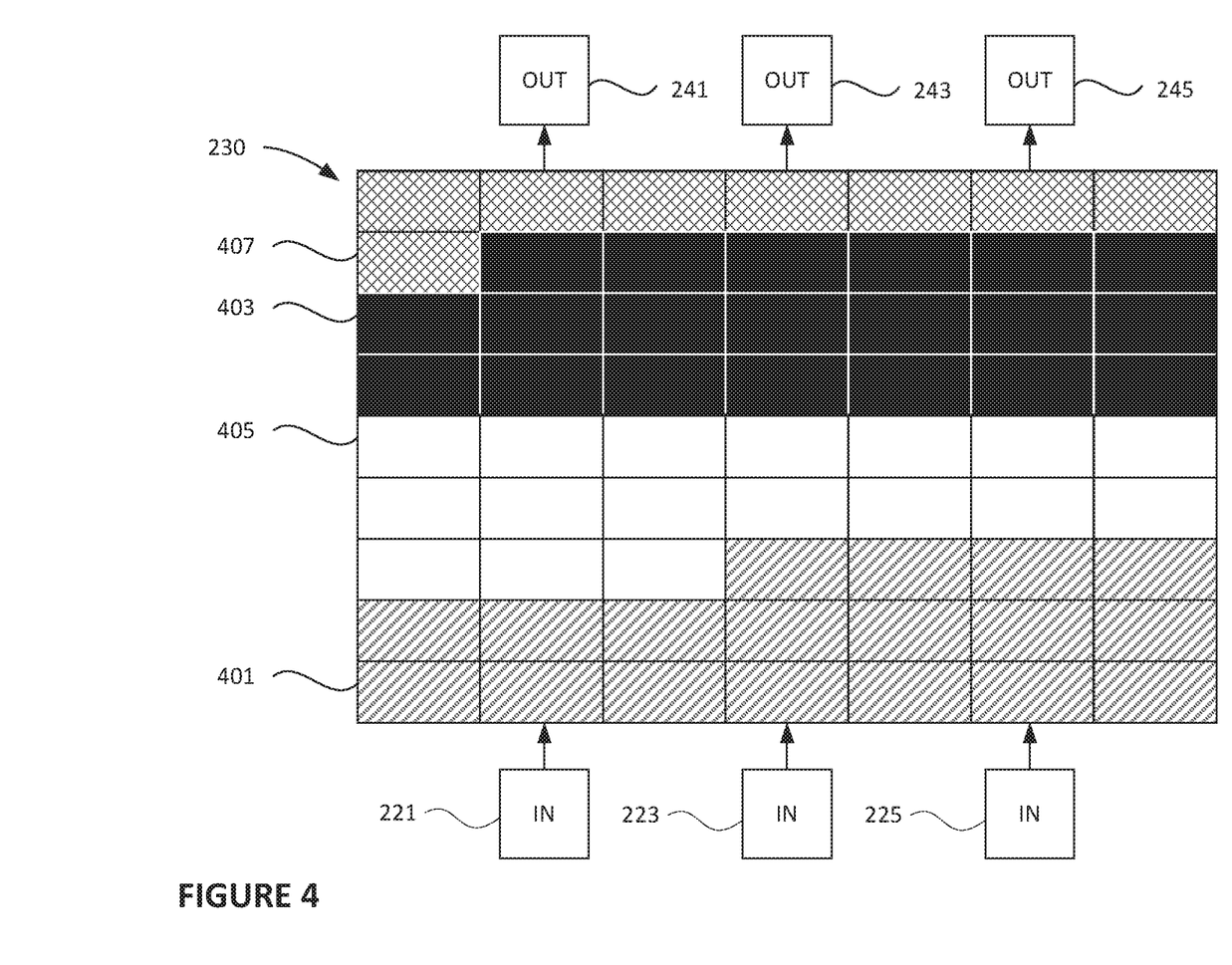
FIG. 4 illustrates an example allocation of cells within a shared buffer with retry buffering cell allocations in accordance with aspects of the disclosure.

FIG. 4 illustrates an example allocation of cells within shared buffer 230 with retry buffering cell allocations. In this regard, cells 401 are allocated to input buffering, cells 403 are allocated to output queuing, cells 405 are allocated to free cell allocation, and cells 407 are allocated to retry buffering. As described herein, a packet being transmitted by the switch 201 using link level retry from a cell allocated to output queuing, the memory controller 210 may reallocate the cell to the retry buffer allocation. As such, cells storing packets that are transmitted using link level retry do not get reallocated from an output queuing allocation to the free cell allocation like cells storing packets that are transmitted without link level retry. Rather, the cells storing packets transmitted using link level retry get reallocated to retry buffering.

A cell allocated to retry buffering may be reallocated to a free cell allocation after the switch 201 receives a receipt acknowledgment or confirmation from the destination to which the packet from that cell was transmitted. In this regard, the retry buffer grows as cells are reallocated to the retry buffer as packets are transmitted using link level retry and shrinks in response to receipt of acknowledgments received from the destinations. In instances when a packet needs to be retransmitted from a cell in the retry buffer, such as when a packet is not received by the intended destination, the packet may be retransmitted and the cell storing the packet may remain allocated in the retry buffer. When the switch sends a cell as a retransmit, there is no change in the cell accounting; the cell remains allocated to the retransmit buffer until freed by an acknowledgment received from the destination. In some instances, a cell allocated to the retry buffer may be released after a predetermined time period. The retry buffer allocation may be capped to a certain number or percentage of cells. By capping the retry buffer, the retry buffer may not continue to grow to consume the entirety of the cell array in the shared buffer 230 when one or more destinations stop responding with acknowledgments of receiving packets.

Figure 5:
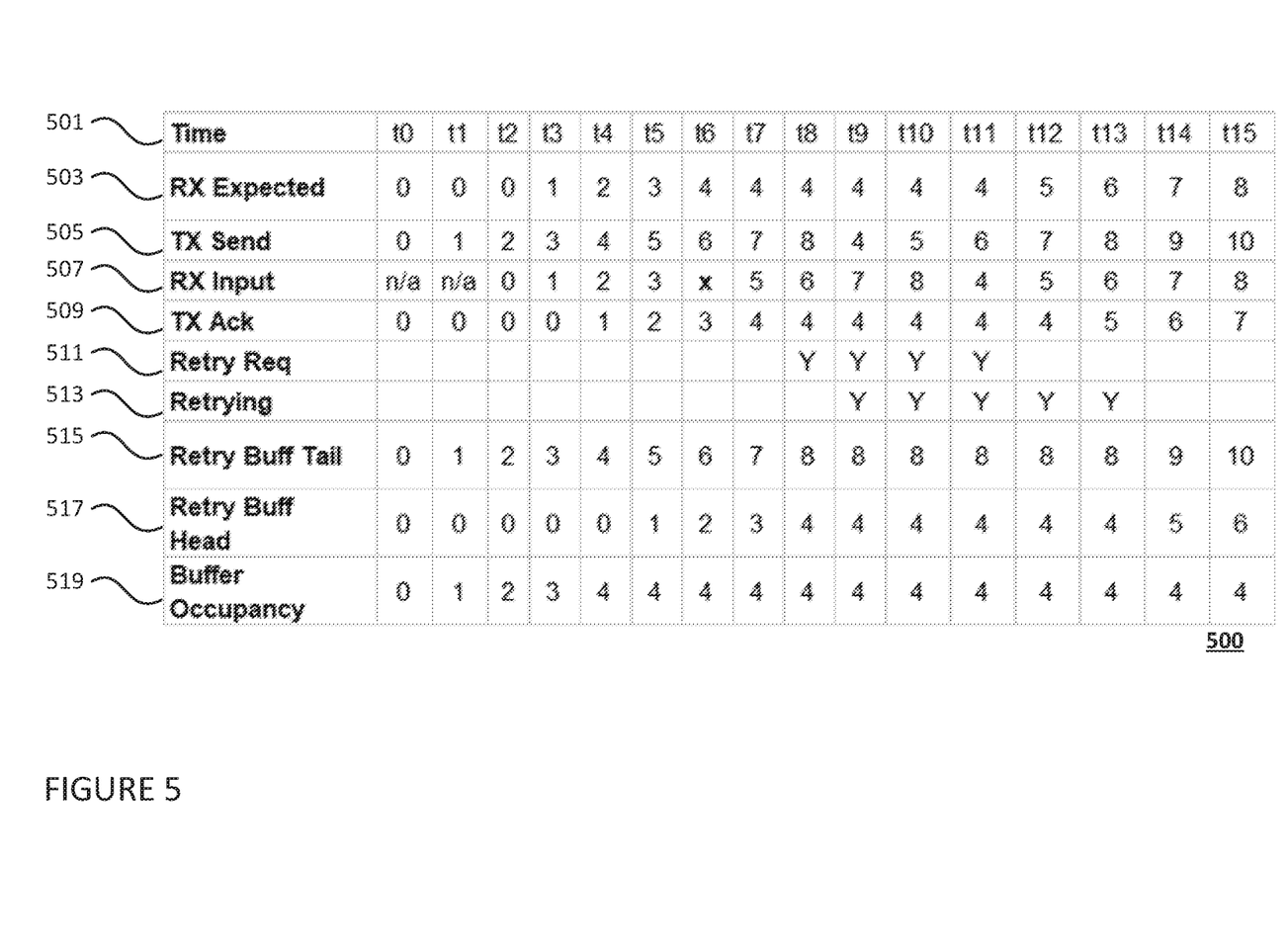
FIG. 5 illustrates a table outlining the communication flow of the network switch with a destination in accordance with aspects of the disclosure.

FIG. 5 includes a table 500 that outlines the communication between a source and a destination during link level retry communication. Table 500 illustrates an example of transmission of packets from a source to a destination over a period of time 501. Each packet sent by a switch, such as switch 201, using link level retry, may be assigned a sequence number, labeled as TX Send in row 505. The destination, such client computing device 110, a data center 160-180, or another switch or network component, may maintain an expected value which is the next packet it will accept, labeled as RX Expected in row 503. Row 507, labeled as RX Input, includes the packets received by the destination. It is understood that the switch 201 may be in communication with many destinations at a time and that the communications shown in table 500 are indicative of only communication between the switch and a single destination. However, similar communications may occur simultaneously with many other destinations.

When a packet received by the destination has a sequence number that matches the expected value, the destination accepts the received packet and increments the expected number. For instance, at time t2 the destination has an expected value of '0' and receives a packet having a sequence number of '0', as illustrated by row 507, labeled RX Input, at time t2. As the destination has received the expected packet, the expected value 503 is increased to '1' at time t3.

The destination may send a receipt acknowledgment to the switch 201. The receipt acknowledgment is illustrated in row 509 labeled TX Ack. In this regard, the receipt acknowledgment indicates the expected value of the packet the destination is next expecting. In other words, the receipt acknowledgment indicates that everything up to but excluding this number has been successfully received by the destination. Continuing the above example, at times t0-t2 the destination is expecting a packet having the expected value of '0', as illustrated in row 503. Accordingly, for time t0-t2, the destination transmits receipt acknowledgments having an expected value of '0' to the switch 201. At time t2 the destination may receive the packet having a sequence number of '0' as expected. Due to processing and/or transmission delays, the receipt acknowledgment received by the switch 201, as indicated in row 509, may be received a time period after being transmitted by the destination. That is to say, TX Ack in row 509 corresponds to the time period the receipt acknowledgment is received by the switch 201, not when the destination sends the acknowledgment. Thus, the switch 201 may receive an acknowledgment that indicates the expected value of the packet as '0' at time t3. Not until time t4 may the receipt acknowledgment value be increased to '1'. Receipt acknowledgments may be sent periodically from the destination to the switch 201, such as every time period, as shown in table 500, or at some other time other incremental time period.

Packets may be dropped during communication. For example, and again referring to table 500 in FIG. 5, at time t6 the destination may be expecting a packet with an expected value of '4'. However, the packet sent by the switch at time t4 having a sequence number '4' may be lost. As a result, the destination may not receive the packet, as illustrated by the 'x' in the RX Input row 507 at time t6. At time t7 the destination may again expect a packet with an expected value of '4', as it was not received at time t6, but may instead receive a packet with a sequence number of '5'.

As the sequence number of '5' is greater than the expected value '4', the destination may determine that the packet was lost and send a retry request to the switch 201 as shown by the 'Y' at time t8 in the Retry Req row 511. The retry request may include the expected value of the packet requested by the destination. At time t9 the switch may respond to the retry request by resending the packet having the sequence number '4' as shown in TX Send row 505 and indicated by the 'Y' in the Retrying row labeled 513. The destination may continue to request the missing packet until the packet is received. In this regard, the destination may receive the missing packet at time t11, as shown in row 507, and thus stop sending retry requests at time t12. In some instances, if the switch receipt acknowledgment from the destination for an expected value that is lower than the number that switch expected and the value of the receipt acknowledgment has not changed for a period greater than some multiple of the round trip delay, the switch may treat the scenario as a retry request. This prevents packets at the end of a transmission sequence from being dropped.

The switch may resend packets having the sequence numbers 5-8 after resending the packet requested in the retry request. In this regard, the destination may not store packets having unexpected values, such as packets 5, 6, 7, and 8 that were received during time periods t7-t10 and sent by the switch 201 during time periods t5-t8. As such, the switch may resend packets having the sequence numbers 5-8 after resending the requested packet having the sequence number '4'. The resending of packets is indicated by the 'Y's' in row 513.

During operation, the switch may be in either of two states, transmitting or retransmitting. In the transmitting state, the switch sends a packet with its sequence number that is initialized by the first TX Ack update received from the destination. In this regard, For every packet sent in transmit mode and for which link level retry is being used, the switch increments the sequence number, and the memory controller 210 reallocates the cell holding the most recently transmitted packet from the output queue to the retry buffer.

As the switch 201 receives TX Ack updates from the destination, the memory controller 210 may free the space in the retry buffer by reallocating the cells storing packets associated with sequence numbers less than the value in the TX Ack as free cells. Additionally, the memory controller 210 may move the pointer to the start of the retry buffer, also called the retry buffer head, which points to the oldest packet in the retry buffer having a value equal to or greater than the value in the TX Ack. For instance, and as shown in Table 500, the retry buffer head, shown in row 517, corresponds to the last value a TX Ack was received from the transmitter.

The retry buffer tail, shown in row 515, represents the packet sent by the switch having the highest sequence number. The buffer occupancy, shown in row 519, is the number of cells allocated to the retry buffer at a given time period.

If the switch 201 receives a retry request, the switch 201 may immediately go into retransmit mode. While there may be no fixed response time to switch into retransmit mode, any packets sent after receiving a retry request and switching into retransmit mode may be discarded by the destination, as previously described. Thus, for efficiency the switch should go into retransmit mode quickly as possible.

In retransmit mode the transmitter starts sending from the retry buffers the oldest packet first, using the packet's original sequence number. When all the packets in the retry buffer have been resent, the switch may return to normal transit mode using the next sequence number. When the switch leaves retransmit mode, the retry buffer may not be empty, as the cells in the retry buffer may only be returned to a free cell allocation by the memory controller 210 in response to acknowledgment receipts being received from the destination.

Figure 6:
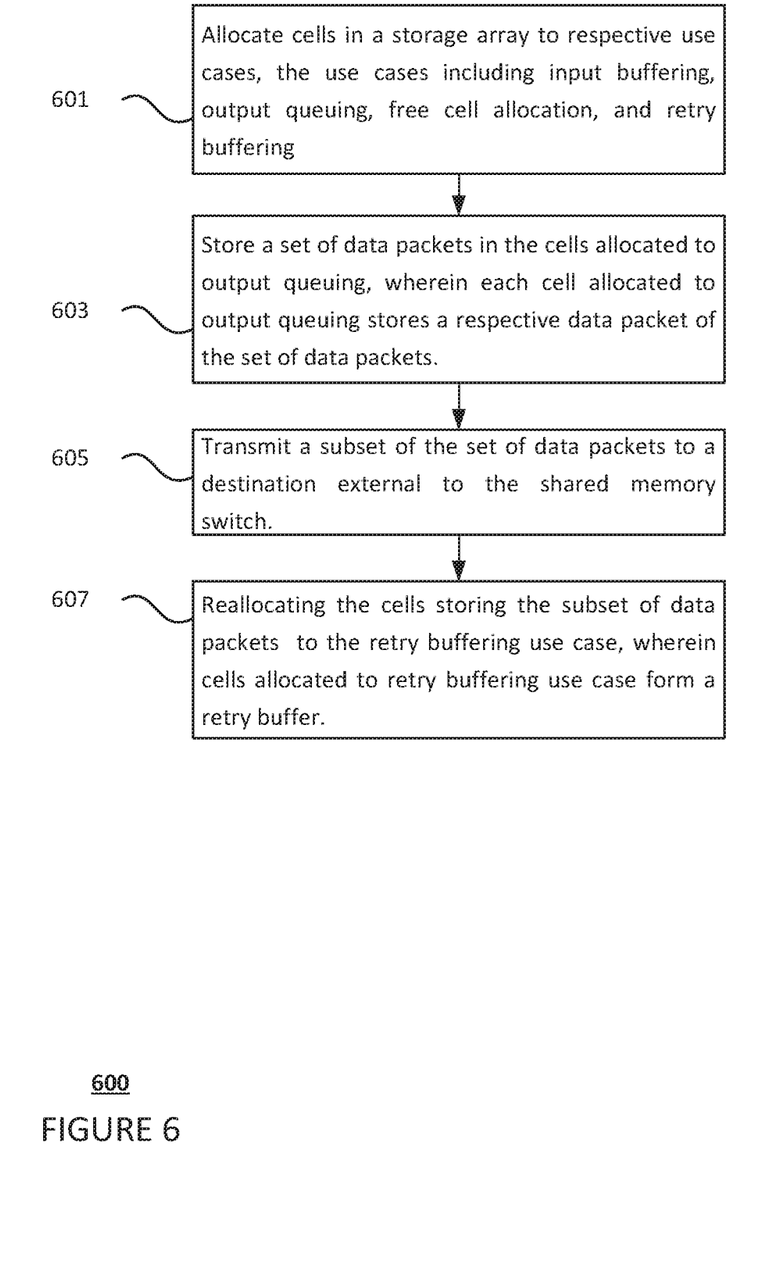
FIG. 6 is a flow diagram outlining the operation of a network switch in accordance with aspects of the disclosure.

FIG. 6 is a flow diagram 600 showing the operation of a shared memory switch, such as shared memory switch 201 capable of handling link level retry, directing packets received from sources to destinations. As shown in block 601, the cells of the shared buffer 230 are allocated into use cases including output queuing, input buffering, free cell allocation, and retry buffering. Allocation of the use cases for the cells may be controlled by the memory controller 210 according to the inflow and outflow of packets into the switch 201.

As shown in block 603, a set of data packets may be stored in the cells allocated to output queuing, wherein each cell allocated to output queuing stores a respective data packet of the set of data packets.

At block 605, a subset of the set of data packets may be transmitted to a destination external to the shared memory switch. The cells storing the subset of data packets may be reallocated to the retry buffering use case, wherein cells allocated to retry buffering use case form a retry buffer, as shown in block 607.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims. The operations described herein do not have to be performed in the precise order described. Rather, various steps can be handled in a different order or simultaneously, and steps may also be added or omitted.

Unless otherwise stated, the foregoing alternative systems, methods and examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A shared memory switch comprising:
one or more input ports;
one or more output ports;
a memory controller; and
a shared buffer including a storage array comprising an array of cells configured to hold packets of data received from one or more sources through the one or more input ports and to be transmitted onto one or more destinations through the one or more output ports, said array of cells configured to store a dynamically resizable retry buffer,
wherein the memory controller is configured to:
allocate each cell in the storage array to a respective use case, the use cases including an input buffering use case, an output queuing use case, a free cell allocation use case, and a retry buffering use case, wherein each cell of the storage array allocated to the output queueing use case is configured to store a packet of data received from the one or more sources in a queue to be transmitted to the one or more destinations, and
reallocate a first cell of the storage array allocated to the output queueing use case to a retry buffering use case after the shared memory switch transmits a packet of data from the first cell to one of the one or more destinations.

2. The shared memory switch of claim 1, wherein each cell of the storage array allocated to the input buffering is configured to receive an incoming packet received from the one or more sources through the one or more input ports.

3. The shared memory switch of claim 1, wherein each cell of the storage array allocated to the free cell allocation use case is capable of being reallocated to the input buffering use case or output queuing use case by the memory controller.

4. The shared memory switch of claim 1, wherein the memory controller is further configured to reallocate the first cell from the retry buffer use case allocation to the free cell allocation use case upon receiving acknowledgment that the one of the one or more destinations received the packet of data.

5. The shared memory switch of claim 1, wherein the packet of data is transmitted to the one of the one or more destinations using link level retry protocols.

6. The shared memory switch of claim 1, wherein the cells having a retry buffer allocation use case are the dynamically resizable retry buffer.

7. The shared memory switch of claim 1, wherein the shared buffer is dynamic random-access memory (DRAM) modules or static random-access memory (SRAM).

8. The shared memory switch of claim 1, wherein the memory controller includes memory and one or more processors.

9. A method for controlling a shared memory switch comprising:
allocating, by one or more processors, cells in a storage array to respective use cases, the use cases including an input buffering use case, an output queuing use case, a free cell allocation use case, and a retry buffering use case;
storing, by the one or more processors, a set of data packets in the cells allocated to the output queuing use case, wherein each cell allocated to the output queuing use case stores a respective data packet of the set of data packets;
transmitting, by the one or more processors, a subset of the set of data packets to a destination external to the shared memory switch; and
reallocating, by the one or more processors, the cells storing the subset of data packets to the retry buffering use case, wherein cells allocated to the retry buffering use case are a retry buffer.

10. The method of claim 9, wherein each data packet in the subset of data packets includes a sequence number, and the subset of data packets are transmitted in an order based on their respective sequence numbers.

11. The method of claim 10, further comprising:
receiving, from the destination, a request for retry of a transmission of one of the data packets in the subset of data packets, the request for retry including an identifier corresponding to a sequence number of one of the data packets in the subset of data packets.

12. The method of claim 11, further comprising:
retransmitting the data packet having the sequence number corresponding to the identifier.

13. The method of claim 12, further comprising:
retransmitting all other packets in the subset of data packets that were transmitted after the data packet having the sequence number corresponding to the identifier.

14. The method of claim 9, further comprising:
receiving, from the destination, an acknowledgment of receipt of the subset of data packets; and
reallocating, in response to receiving the acknowledgment of receipt, the cells storing the subset of data packets to the free cell allocation use case.

15. A non-transitory computer readable medium containing program instructions, the instructions when executed by one or more computing devices, cause the one or more computing devices to perform the steps of:
allocating cells in a storage array with a shared memory switch to respective use cases, the use cases including an input buffering use case, an output queuing use case, a free cell allocation use case, and a retry buffering use case;
storing a set of data packets in the cells allocated to the output queuing use case, wherein each cell allocated to the output queuing use case stores a respective data packet of the set of data packets;
transmitting a subset of the set of data packets to a destination external to the shared memory switch; and
reallocating the cells storing the subset of data packets to the retry buffering use case, wherein cells allocated to the retry buffering use case are a retry buffer.

16. The non-transitory computer readable medium of claim 15, wherein each data packet in the subset of data packets includes a sequence number, and the subset of data packets are transmitted in an order based on their respective sequence numbers.

17. The non-transitory computer readable medium of claim 15, wherein the instructions further cause the one or more computing devices to receive, from the destination, a request for retry of a transmission of one of the data packets in the subset of data packets, the request for retry including an identifier corresponding to a sequence number of one of the data packets in the subset of data packets.

* * * * *